United States Patent
Lin et al.

(10) Patent No.: US 10,554,139 B2
(45) Date of Patent: Feb. 4, 2020

(54) SYNCHRONOUS RECTIFIER APPLIED TO A SECONDARY SIDE OF A POWER CONVERTER AND OPERATIONAL METHOD THEREOF

(71) Applicant: Leadtrend Technology Corp., Hsinchu County (TW)

(72) Inventors: Chung-Wei Lin, Hsinchu County (TW); Ming-Chang Tsou, Hsinchu County (TW); Jun-Hao Huang, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 16/218,491

(22) Filed: Dec. 13, 2018

(65) Prior Publication Data

US 2019/0363635 A1    Nov. 28, 2019

(30) Foreign Application Priority Data

May 23, 2018    (TW) .............................. 107117458 A

(51) Int. Cl.
*H02M 3/335*    (2006.01)
*H02M 1/00*    (2006.01)

(52) U.S. Cl.
CPC .............. *H02M 3/33592* (2013.01); *H02M 2001/0048* (2013.01)

(58) Field of Classification Search
CPC ................................................ H02M 3/33592
See application file for complete search history.

(56) References Cited

U.S. PATENT DOCUMENTS

| | | | | |
|---|---|---|---|---|
| 6,771,059 B1* | 8/2004 | Zwicker | ............ | H02M 3/33523 324/119 |
| 10,224,828 B1* | 3/2019 | Sigamani | .......... | H02M 3/33592 |
| 2002/0191422 A1* | 12/2002 | Takagi | .............. | H02M 3/33592 363/21.06 |
| 2013/0063985 A1* | 3/2013 | Ye | ........................... | H02M 1/38 363/21.05 |
| 2015/0333641 A1* | 11/2015 | Gong | ................ | H02M 3/33592 363/21.14 |
| 2017/0302194 A1* | 10/2017 | Zhang | .................... | H02M 1/08 |

\* cited by examiner

*Primary Examiner* — Adolf D Berhane
*Assistant Examiner* — Kevin H Sprenger
(74) *Attorney, Agent, or Firm* — Winston Hsu

(57) ABSTRACT

A synchronous rectifier applied to a secondary side of a power converter includes a forbidden turning-on time generation circuit, a green mode signal generation circuit, and a controller. The forbidden turning-on time generation circuit generates a forbidden turning-on time corresponding to the secondary side according to a synchronous signal of the secondary side. The green mode signal generation circuit enables a green mode signal when the forbidden turning-on time is greater than a reference value by at least one time, and disables the green mode signal when the forbidden turning-on time is continuously less than a reference value by a predetermined number of times. The reference value is changed with an output voltage of the secondary side. The controller enters a green mode when the green mode signal is enabled, and leaves the green mode when the green mode signal is disabled.

14 Claims, 3 Drawing Sheets

SYNCHRONOUS RECTIFIER APPLIED TO A SECONDARY SIDE OF A POWER CONVERTER AND OPERATIONAL METHOD THEREOF

BACKGROUND OF THE INVENTION

1. Field of the Invention

The present invention relates to a synchronous rectifier applied to a secondary side of a power converter and an operation method thereof, and particularly to a synchronous rectifier and an operation method thereof that can determine whether a controller of the secondary side of the power converter enters a green mode according to a reference value and a forbidden turning-on time of the secondary side of the power converter being changed with an output voltage of the power converter.

2. Description of the Prior Art

When a power converter operates at a discontinuous conduction mode (DCM) or at a quasi-resonant mode, a primary controller applied to a primary side of the power converter generates a gate control signal corresponding to a burst mode to control turning-on and turning-off of a power switch of the primary side, wherein a number of the gate control signal corresponding to the burst mode is changed with an output voltage of a secondary side of the power converter. Because a discharge time of the secondary side of the power converter is changed with the number of the gate control signal corresponding to the burst mode, a forbidden turning-on time of the secondary side of the power converter is also changed with the number of the gate control signal corresponding to the burst mode (that is, the forbidden turning-on time is changed with the output voltage). However, because the prior art determines whether a controller of the secondary side of the power converter enters a green mode according to a fixed reference value and the forbidden turning-on time, but the forbidden turning-on time is changed with the output voltage, the controller of the secondary side of the power converter may not enter the green mode because the forbidden turning-on time is changed with the output voltage, resulting in the controller wasting too much energy when the power converter operates at the discontinuous conduction mode or at the quasi-resonant mode.

SUMMARY OF THE INVENTION

An embodiment of the present invention provides a synchronous rectifier applied to a secondary side of a power converter. The synchronous rectifier includes a forbidden turning-on time generation circuit, a green mode signal generation circuit, and a controller. The forbidden turning-on time generation circuit is coupled to the secondary side of the power converter for generating a forbidden turning-on time corresponding to the secondary side according to a synchronous signal of the secondary side. The green mode signal generation circuit is coupled to the forbidden turning-on time generation circuit and the secondary side for enabling a green mode signal when the forbidden turning-on time is greater than a reference value by at least one time, and disabling the green mode signal when the forbidden turning-on time is continuously less than the reference value by a predetermined number of times, wherein the reference value is changed with an output voltage of the secondary side. The controller is coupled to the green mode signal generation circuit and the secondary side for entering a green mode when the green mode signal is enabled, and leaving the green mode when the green mode signal is disabled.

Another embodiment of the present invention provides an operation method of a synchronous rectifier applied to a secondary side of a power converter, wherein the synchronous rectifier includes a forbidden turning-on time generation circuit, a green mode signal generation circuit, and a controller. The operation method includes the forbidden turning-on time generation circuit generating a forbidden turning-on time corresponding to the secondary side according to a synchronous signal of the secondary side; the green mode signal generation circuit enabling a green mode signal when the forbidden turning-on time is greater than a reference value by at least one time, wherein the reference value is changed with an output voltage of the secondary side; and the controller entering a green mode when the green mode signal is enabled.

The present invention provides a synchronous rectifier applied to a secondary side of a power converter and an operation method thereof. The synchronous rectifier and the operation method utilize a forbidden turning-on time generation circuit to generate a forbidden turning-on time corresponding to the secondary side according to a synchronous signal of the secondary side, and utilize a green mode signal generation circuit to determine to enable or disable a green mode signal according to the forbidden turning-on time and a reference value. Then, a controller can enter or leave a green mode according to whether the green mode signal is enabled or not. Therefore, compared to the prior art, because the reference value is changed with an output voltage of the secondary side of the power converter, when the forbidden turning-on time is changed with the output voltage of the secondary side of the power converter, the controller can still enter the green mode when the forbidden turning-on time is changed with the output voltage of the secondary side of the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
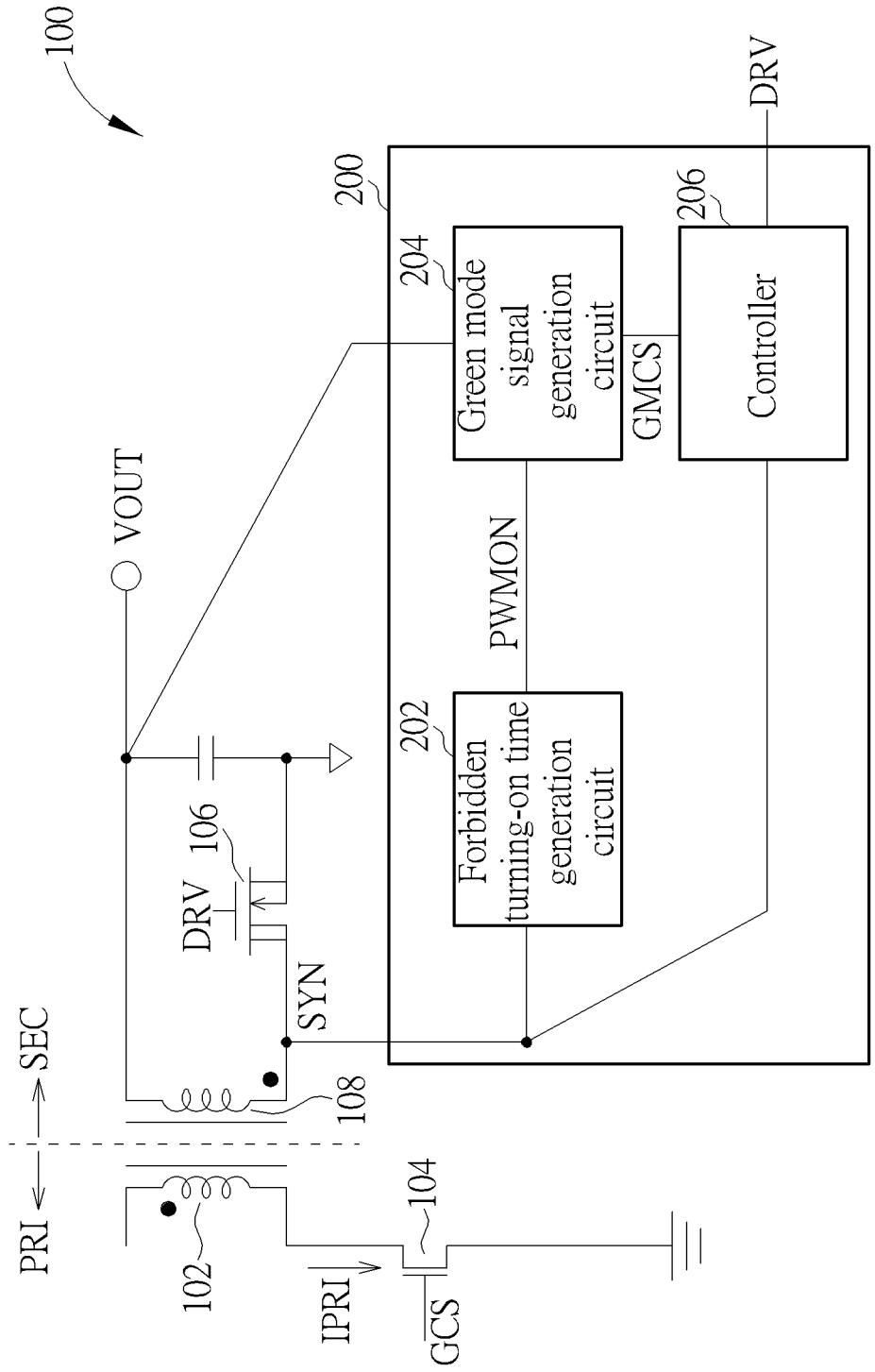
FIG. 1 is a diagram illustrating a synchronous rectifier applied to a secondary side SEC of a power converter according to a first embodiment of the present invention.

Please refer to FIG. 1. FIG. 1 is a diagram illustrating a synchronous rectifier 200 applied to a secondary side SEC of a power converter 100 according to a first embodiment of the present invention, wherein in regard to a primary side PRI of the power converter 100, FIG. 1 only shows a primary winding 102 and a power switch 104, and the power converter 100 is an alternating current/direct current power converter. As shown in FIG. 1, the synchronous rectifier 200 includes a forbidden turning-on time generation circuit 202, a green mode signal generation circuit 204, and a controller 206, wherein as shown in FIG. 1, the forbidden turning-on time generation circuit 202 is coupled to a drain of a synchronous switch 106 of the secondary side SEC of the power converter 100, the green mode signal generation circuit 204 is coupled to the forbidden turning-on time generation circuit 202 and an output terminal of the secondary side SEC of the power converter 100, and the controller 206 is coupled to the green mode signal generation circuit 204 and the drain of the synchronous switch 106 of the secondary side SEC of the power converter 100.

Figure 2:
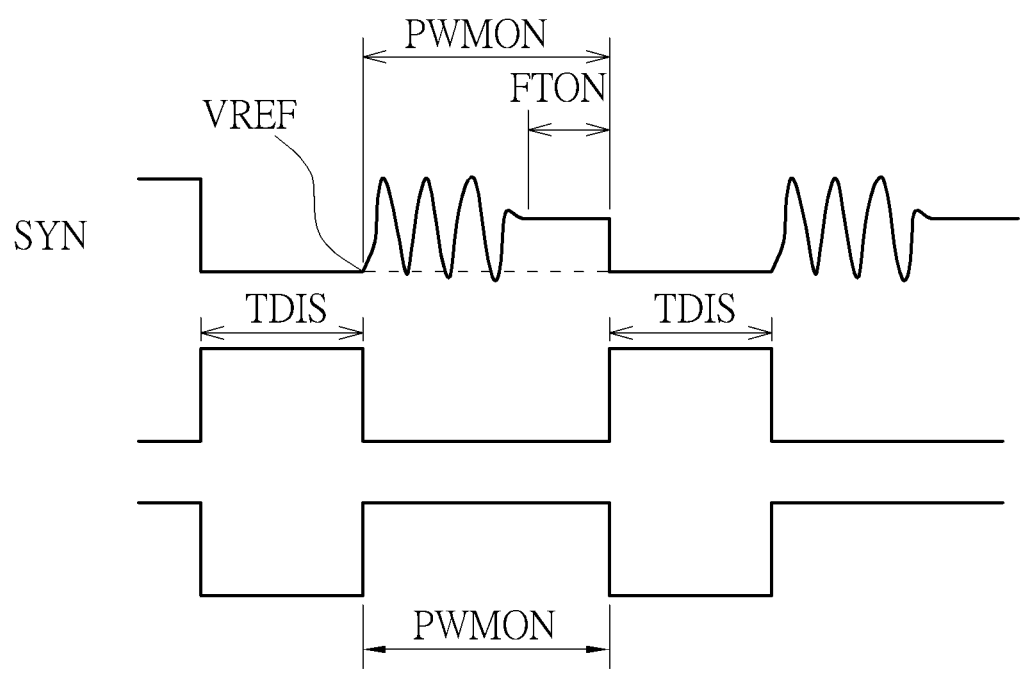
FIG. 2 is a diagram illustrating the synchronous signal, and the discharge time and the forbidden turning-on time of the secondary side of the power converter.

As shown in FIG. 1, when the power switch 104 is turned on, a secondary side winding 108 of the secondary side SEC of the power converter 100 can generate a synchronous signal SYN according to a current IPRI flowing through the primary side PRI of the power converter 100, wherein the power converter 100 operates at a discontinuous conduction mode (DCM) or at a quasi-resonant mode. That is to say, the power converter 100 is coupled to a light load or no load is coupled to the power converter 100. Because the forbidden turning-on time generation circuit 202 is coupled to the drain of the synchronous switch 106 of the secondary side SEC of the power converter 100, the forbidden turning-on time generation circuit 202 can determine a discharge time TDIS (shown in FIG. 2) of the secondary side SEC of the power converter 100 according to the synchronous signal SYN and a reference voltage VREF (e.g. 0.1V, 0.2V, or 0.5V, etc.), and generate a forbidden turning-on time PWMON corresponding to the secondary side SEC of the power converter 100 according to the discharge time TDIS. Because the forbidden turning-on time generation circuit 202 can generate the forbidden turning-on time PWMON according to the discharge time TDIS, the forbidden turning-on time PWMON corresponds to the discharge time TDIS. In addition, if the power converter 100 operates at a continuous conduction mode (CCM), the forbidden turning-on time PWMON is equal to a turning-on time of the power switch 104 of the primary side PRI of the power converter 100. However, as shown in FIG. 2, because the power converter 100 operates at the discontinuous conduction mode (or the quasi-resonant mode), the forbidden turning-on time PWMON is greater than a turning-on time FTON of the power switch 104 of the primary side PRI of the power converter 100. In addition, as shown in FIG. 2, in one embodiment of the present invention, the forbidden turning-on time generation circuit 202 reverses the discharge time TDIS to generate the forbidden turning-on time PWMON. But, in another embodiment of the present invention, the forbidden turning-on time generation circuit 202 counts at least one valley of the synchronous signal SYN to generate the forbidden turning-on time PWMON according to the synchronous signal SYN and the reference voltage VREF. That is to say, the forbidden turning-on time PWMON corresponds to a number of valleys of the synchronous signal SYN. In addition, in another embodiment of the present invention, although the forbidden turning-on time generation circuit 202 reverses the discharge time TDIS to generate the forbidden turning-on time PWMON, the forbidden turning-on time generation circuit 202 outputs a forbidden turning-on signal which is in proportion to the forbidden turning-on time PWMON to the green mode signal generation circuit 204. For example, a ratio of the forbidden turning-on signal to the forbidden turning-on time PWMON is equal to 0.8. But, the present invention is not limited to the ratio of the forbidden turning-on signal to the forbidden turning-on time PWMON being equal to 0.8. In addition, as shown in FIG. 2, during the forbidden turning-on time PWMON, the secondary side SEC of the power converter 100 is turned off.

As shown in FIG. 1, after the green mode signal generation circuit 204 receives the forbidden turning-on time PWMON, the green mode signal generation circuit 204 can compare the forbidden turning-on time PWMON with a reference value to determine whether to enable a green mode signal GMCS, wherein when the forbidden turning-on time PWMON is greater than the reference value by at least one time, the green mode signal generation circuit 204 enables the green mode signal GMCS, when the forbidden turning-on time PWMON is continuously less than the reference value by a predetermined number of times, the green mode signal generation circuit 204 disables the green mode signal GMCS, and the reference value and the predetermined number of times are changed with an output voltage VOUT of the secondary side SEC of the power converter 100. For example, when the output voltage VOUT is less than 5V, the reference value is 1.5 mS, so when the forbidden turning-on time PWMON is greater than the reference value (1.5 mS), the green mode signal generation circuit 204 enables green mode signal GMCS, and when the forbidden turning-on time PWMON is continuously less than the reference value (1.5 mS) by the predetermined number of times (e.g. 10 times), the green mode signal generation circuit 204 disables the green mode signal GMCS; when the output voltage VOUT is between 5V and 10V, the reference value is 0.7 mS, so when the forbidden turning-on time PWMON is greater than the reference value (0.7 mS), the green mode signal generation circuit 204 enables the green mode signal GMCS, and when the forbidden turning-on time PWMON is continuously less than the reference value (0.7 mS) by the predetermined number of times (e.g. 20 times), the green mode signal generation circuit 204 disables the green mode signal GMCS; and when the output voltage VOUT is greater than 10V, the reference value is 0.2 mS, so when the forbidden turning-on time PWMON is greater than the reference value (0.2 mS), the green mode signal generation circuit 204 enables the green mode signal GMCS, and when the forbidden turning-on time PWMON is continuously less than the reference value (0.2 mS) by the predetermined number of times (e.g. 30 times), the green mode signal generation circuit 204 disables the green mode signal GMCS. In addition, the present invention is not limited to the above mentioned reference values (1.5 mS, 0.7 mS, 0.2 mS) and the predetermined number of times (10 times, 20 times, 30 times).

In addition, after the green mode signal generation circuit 204 enables the green mode signal GMCS, the controller 206 can enter a green mode (that is, the synchronous rectifier 200 enters the green mode) from the discontinuous conduction mode (or the quasi-resonant mode) according to the green mode signal GMCS. After the controller 206 enters the green mode, the controller 206 is turned off and stops generating a driving signal DRV driving the synchronous switch 106. In addition, after the green mode signal generation circuit 204 enables the green mode signal GMCS, not only the controller 206 is turned off, but also circuits included in the synchronous rectifier 200 except the forbidden turning-on time generation circuit 202 and the green mode signal generation circuit 204 are turned off. On the other hand, after the green mode signal generation circuit 204 disables the green mode signal GMCS, the controller 206 enters the discontinuous conduction mode (or the quasi-resonant mode) from the green mode, that is, the synchronous rectifier 200 enters the discontinuous conduction mode (or the quasi-resonant mode) from the green mode. After the controller 206 leaves the green mode, the controller 206 is turned on and generates the driving signal DRV driving the synchronous switch 106 again. In addition, after the green mode signal generation circuit 204 disables the green mode signal GMCS, not only the controller 206 is turned on, but also the circuits included in the synchronous rectifier 200 except the forbidden turning-on time generation circuit 202 and the green mode signal generation circuit 204 are turned on.

When the power converter 100 operates at the discontinuous conduction mode (or the quasi-resonant mode), a primary controller (not shown in FIG. 1) applied to the primary side PRI of the power converter 100 generates a gate control signal GCS corresponding to a burst mode to control turning-on and turning-off of the power switch 104, wherein a number of the gate control signal GCS corresponding to the burst mode is changed with the output voltage VOUT. Because the discharge time TDIS of the secondary side SEC of the power converter 100 is changed with the number of the gate control signal GCS corresponding to the burst mode, the forbidden turning-on time PWMON is also changed with the number of the gate control signal GCS corresponding to the burst mode (that is, the forbidden turning-on time PWMON is changed with the output voltage VOUT). However, because the reference value and the predetermined number of times are also changed with the output voltage VOUT of the secondary side SEC of the power converter 100, the synchronous rectifier 200 provided by the present invention can still enter the green mode when the forbidden turning-on time PWMON is changed with the output voltage VOUT.

Figure 3:
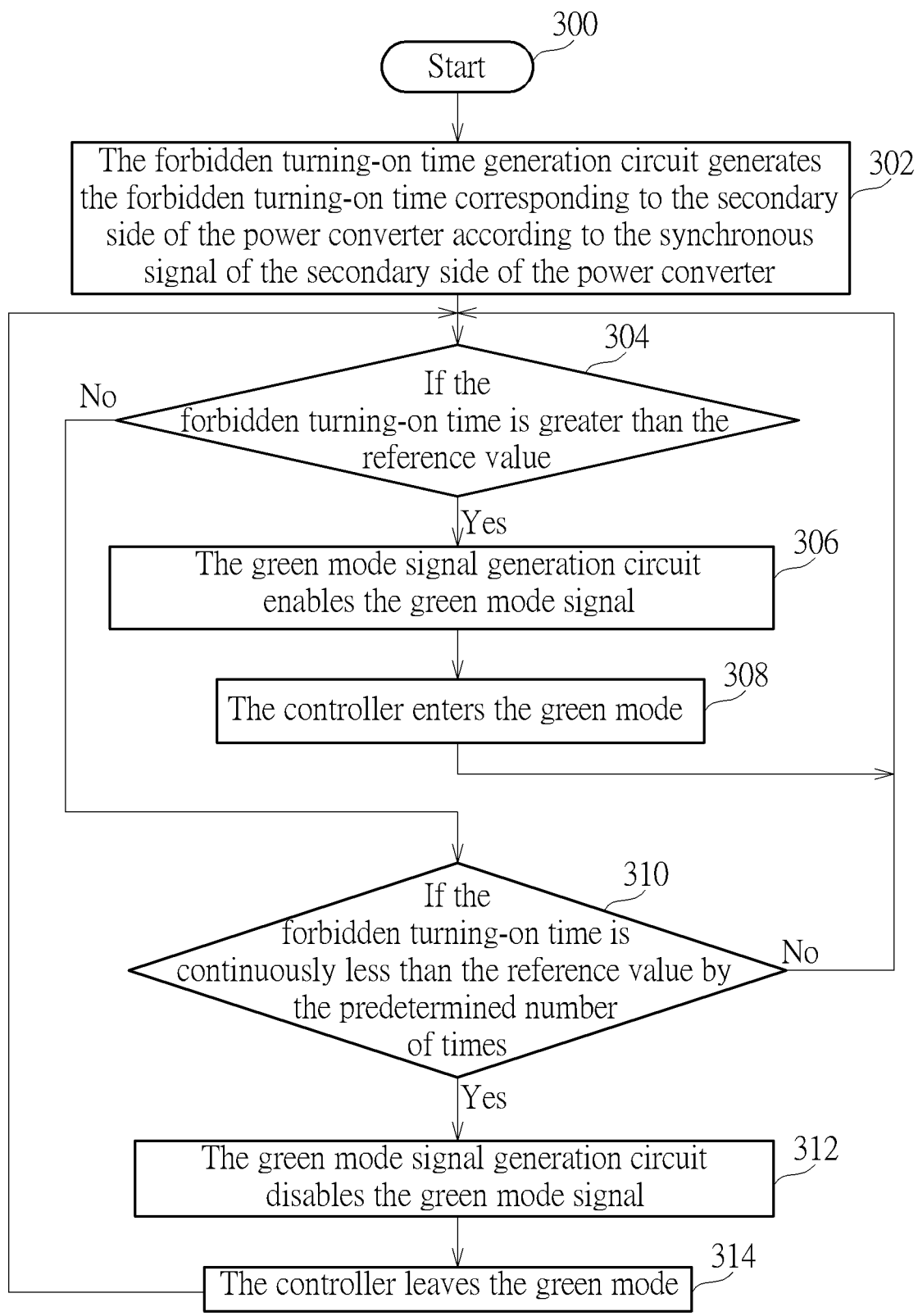
FIG. 3 is a flowchart illustrating an operation method of a synchronous rectifier applied to a secondary side of a power converter according to a second embodiment of the present invention.

Please refer to FIGS. 1-3. FIG. 3 is a flowchart illustrating an operation method of a synchronous rectifier applied to a secondary side of a power converter according to a second embodiment of the present invention. The operation method in FIG. 3 is illustrated using the power converter 100 and the synchronous rectifier 200 shown in FIG. 1. Detailed steps are as follows:

Step 300: Start.

Step 302: The forbidden turning-on time generation circuit 202 generates the forbidden turning-on time PWMON corresponding to the secondary side SEC of the power converter 100 according to the synchronous signal SYN of the secondary side SEC of the power converter 100.

Step 304: If the forbidden turning-on time PWMON is greater than the reference value; if yes, go to Step 306; if no, go to Step 310.

Step 306: The green mode signal generation circuit 204 enables the green mode signal GMCS.

Step 308: The controller 206 enters the green mode, go to Step 304.

Step 310: If the forbidden turning-on time PWMON is continuously less than the reference value by the predetermined number of times; if yes, go to Step 312; if no, go to Step 304.

Step 312: The green mode signal generation circuit 204 disables the green mode signal GMCS.

Step 314: The controller 206 leaves the green mode, go to Step 304.

In Step 302, as shown in FIG. 1, when the power switch 104 is turned on, the secondary side winding 108 of the secondary side SEC of the power converter 100 can generate the synchronous signal SYN according to the current IPRI flowing through the primary side PRI of the power converter 100, wherein the power converter 100 operates at the discontinuous conduction mode or at the quasi-resonant mode. That is to say, the power converter 100 is coupled to a light load or no load is coupled to the power converter 100. Therefore, the forbidden turning-on time generation circuit 202 can determine the discharge time TDIS (shown in FIG. 2) of the secondary side SEC of the power converter 100 according to the synchronous signal SYN and the reference voltage VREF (e.g. 0.1V, 0.2V, or 0.5V, etc.), and generate the forbidden turning-on time PWMON corresponding to the secondary side SEC of the power converter 100 according to the discharge time TDIS. Because the forbidden turning-on time generation circuit 202 can generate the forbidden turning-on time PWMON according to the discharge time TDIS, the forbidden turning-on time PWMON corresponds to the discharge time TDIS. In addition, as shown in FIG. 2, in one embodiment of the present invention, the forbidden turning-on time generation circuit 202 reverses the discharge time TDIS to generate the forbidden turning-on time PWMON. But, in another embodiment of the present invention, the forbidden turning-on time generation circuit 202 counts at least one valley of the synchronous signal SYN to generate the forbidden turning-on time PWMON according to the synchronous signal SYN and the reference voltage VREF. That is to say, the forbidden turning-on time PWMON corresponds to the number of valleys of the synchronous signal SYN. In addition, in another embodiment of the present invention, although the forbidden turning-on time generation circuit 202 reverses the discharge time TDIS to generate the forbidden turning-on time PWMON, the forbidden turning-on time generation circuit 202 outputs the forbidden turning-on signal which is in proportion to the forbidden turning-on time PWMON to the green mode signal generation circuit 204. For example, the ratio of the forbidden turning-on signal to the forbidden turning-on time PWMON is equal to 0.8.

In Step 304, as shown in FIG. 1, after the green mode signal generation circuit 204 receives the forbidden turning-on time PWMON, the green mode signal generation circuit 204 can compare the forbidden turning-on time PWMON with the reference value to determine whether to enable the green mode signal GMCS. In Step 306, when the forbidden turning-on time PWMON is greater than the reference value by at least one time, the green mode signal generation circuit 204 enables the green mode signal GMCS, wherein the reference value is changed with the output voltage VOUT of the secondary side SEC of the power converter 100. For example, when the output voltage VOUT is less than 5V, the reference value is 1.5 mS, so when the forbidden turning-on time PWMON is greater than the reference value (1.5 mS), the green mode signal generation circuit 204 enables green mode signal GMCS; when the output voltage VOUT is between 5V and 10V, the reference value is 0.7 mS, so when the forbidden turning-on time PWMON is greater than the reference value (0.7 mS), the green mode signal generation circuit 204 enables the green mode signal GMCS; and when the output voltage VOUT is greater than 10V, the reference value is 0.2 mS, so when the forbidden turning-on time PWMON is greater than the reference value (0.2 mS), the green mode signal generation circuit 204 enables the green mode signal GMCS. In Step 308, after the green mode signal generation circuit 204 enables the green mode signal GMCS, the controller 206 can enter the green mode (that is, the synchronous rectifier 200 enters the green mode) from the discontinuous conduction mode (or the quasi-resonant mode) according to the green mode signal GMCS. After the controller 206 enters the green mode, the controller 206 is turned off and stops generating the driving signal DRV driving the synchronous switch 106. In addition, after the green mode signal generation circuit 204 enables the green mode signal GMCS, not only the controller 206 is turned off, but also the circuits included in the synchronous rectifier 200 except the forbidden turning-on time generation circuit 202 and the green mode signal generation circuit 204 are turned off.

In Step 312, when the forbidden turning-on time PWMON is continuously less than the reference value by the predetermined number of times, the green mode signal generation circuit 204 disables the green mode signal GMCS, and the reference value and the predetermined number of times are changed with an output voltage VOUT of the secondary side SEC of the power converter 100. For example, when the output voltage VOUT is less than 5V, the reference value is 1.5 mS, so when the forbidden turning-on time PWMON is continuously less than the reference value (1.5 mS) by the predetermined number of times (e.g. 10 times), the green mode signal generation circuit 204 disables the green mode signal GMCS; when the output voltage VOUT is between 5V and 10V, the reference value is 0.7 mS, so when the forbidden turning-on time PWMON is continuously less than the reference value (0.7 mS) by the predetermined number of times (e.g. 20 times), the green mode signal generation circuit 204 disables the green mode signal GMCS; and when the output voltage VOUT is greater than 10V, the reference value is 0.2 mS, so when the forbidden turning-on time PWMON is continuously less than the reference value (0.2 mS) by the predetermined number of times (e.g. 30 times), the green mode signal generation circuit 204 disables the green mode signal GMCS.

In Step 314, after the green mode signal generation circuit 204 disables the green mode signal GMCS, the controller 206 enters the discontinuous conduction mode (or the quasi-resonant mode) from the green mode, that is, the synchronous rectifier 200 enters the discontinuous conduction mode (or the quasi-resonant mode) from the green mode. After the controller 206 leaves the green mode, the controller 206 is turned on and generates the driving signal DRV driving the synchronous switch 106 again. In addition, after the green mode signal generation circuit 204 disables the green mode signal GMCS, not only the controller 206 is turned on, but also the circuits included in the synchronous rectifier 200 except the forbidden turning-on time generation circuit 202 and the green mode signal generation circuit 204 are turned on.

When the power converter 100 operates at the discontinuous conduction mode (or the quasi-resonant mode), the primary controller (not shown in FIG. 1) applied to the primary side PRI of the power converter 100 generates the gate control signal GCS corresponding to the burst mode) to control turning-on and turning-off of the power switch 104, wherein the number of the gate control signal GCS corresponding to the burst mode is changed with the output voltage VOUT. Because the discharge time TDIS of the secondary side SEC of the power converter 100 is changed with the number of the gate control signal GCS corresponding to the burst mode, the forbidden turning-on time PWMON is also changed with the number of the gate control signal GCS corresponding to the burst mode (that is, the forbidden turning-on time PWMON is changed with the output voltage VOUT). However, because the reference value and the predetermined number of times are also changed with the output voltage VOUT of the secondary side SEC of the power converter 100, the synchronous rectifier 200 provided by the present invention can still enter the green mode when the forbidden turning-on time PWMON is changed with the output voltage VOUT.

To sum up, the synchronous rectifier and the operation method thereof utilize the forbidden turning-on time generation circuit to generate the forbidden turning-on time corresponding to the secondary side according to the synchronous signal of the secondary side, and utilize the green mode signal generation circuit to determine to enable or disable the green mode signal according to the forbidden turning-on time and the reference value. Then, the controller can enter or leave the green mode according to whether the green mode signal is enabled or not. Therefore, compared to the prior art, because the reference value and the predetermined number of times are changed with the output voltage of the secondary side of the power converter, when the forbidden turning-on time is changed with the output voltage of the secondary side of the power converter, the controller can still enter the green mode when the forbidden turning-on time is changed with the output voltage of the secondary side of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous rectifier applied to a secondary side of a power converter, comprising:
   a forbidden turning-on time generation circuit coupled to the secondary side of the power converter for generating a forbidden turning-on time corresponding to the secondary side according to a synchronous signal of the secondary side;
   a green mode signal generation circuit coupled to the forbidden turning-on time generation circuit and the secondary side for enabling a green mode signal when the forbidden turning-on time is greater than a reference value by at least one time, and disabling the green mode signal when the forbidden turning-on time is continuously less than the reference value by a predetermined number of times, wherein the reference value is changed with an output voltage of the secondary side; and
   a controller coupled to the green mode signal generation circuit and the secondary side for entering a green mode when the green mode signal is enabled, and leaving the green mode when the green mode signal is disabled, wherein when the controller leaves the green mode, the controller generates a driving signal driving a synchronous switch of the secondary side according to the synchronous signal.

2. The synchronous rectifier of claim 1, wherein when the controller enters the green mode, the controller stops generating the driving signal driving the synchronous switch of the secondary side, and when the controller leaves the green mode, the controller generates the driving signal.

3. The synchronous rectifier of claim 1, wherein the forbidden turning-on time corresponds to a discharge time of the secondary side.

4. The synchronous rectifier of claim 3, wherein the forbidden turning-on time is inverse to the discharge time.

5. The synchronous rectifier of claim 1, wherein the predetermined number of times is changed with the output voltage of the secondary side.

6. The synchronous rectifier of claim 1, wherein the forbidden turning-on time corresponds to a number of a valley of the synchronous signal.

7. An operation method of a synchronous rectifier applied to a secondary side of a power converter, wherein the synchronous rectifier comprises a forbidden turning-on time generation circuit, a green mode signal generation circuit, and a controller, the operation method comprising:

the forbidden turning-on time generation circuit generating a forbidden turning-on time corresponding to the secondary side according to a synchronous signal of the secondary side;

the green mode signal generation circuit enabling a green mode signal when the forbidden turning-on time is greater than a reference value by at least one time, wherein the reference value is changed with an output voltage of the secondary side; and the controller entering a green mode when the green mode signal is enabled, wherein the controller generates a driving signal driving a synchronous switch of the secondary side according to the synchronous signal when the controller leaves the green mode.

8. The operation method of claim 7, wherein when the controller enters the green mode, the controller stops generating the driving signal driving the synchronous switch of the secondary side.

9. The operation method of claim 7, further comprising:

the green mode signal generation circuit disabling the green mode signal when the forbidden turning-on time is continuously less than the reference value by a predetermined number of times; and the controller leaving the green mode when the green mode signal is disabled.

10. The operation method of claim 9, wherein when the controller leaves the green mode, the controller generates the driving signal.

11. The operation method of claim 7, wherein the forbidden turning-on time corresponds to a discharge time of the secondary side.

12. The operation method of claim 11, wherein the forbidden turning-on time is inverse to the discharge time.

13. The operation method of claim 7, wherein the predetermined number of times is changed with the output voltage of the secondary side.

14. The operation method of claim 7, wherein the forbidden turning-on time corresponds to a number of a valley of the synchronous signal.

* * * * *